(12) United States Patent
Van De Sluis et al.

(10) Patent No.: US 9,491,834 B2
(45) Date of Patent: Nov. 8, 2016

(54) METHOD OF ASSIGNING LIGHTING DEVICES TO A GROUP

(71) Applicant: KONINKLIJKE PHILIPS N.V., Eindhoven (NL)

(72) Inventors: Bartel Marinus Van De Sluis, Eindhoven (NL); Tim Corneel Wilhelmus Schenk, Eindhoven (NL); Michiel Adriaanzoon Klompenhouwer, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/759,799

(22) PCT Filed: Jan. 3, 2014

(86) PCT No.: PCT/IB2014/058035
§ 371 (c)(1),
(2) Date: Jul. 8, 2015

(87) PCT Pub. No.: WO2014/108817
PCT Pub. Date: Jul. 17, 2014

(65) Prior Publication Data
US 2015/0359073 A1 Dec. 10, 2015

Related U.S. Application Data

(60) Provisional application No. 61/749,966, filed on Jan. 8, 2013.

(51) Int. Cl.
*H05B 37/02* (2006.01)

(52) U.S. Cl.
CPC ...... *H05B 37/0227* (2013.01); *H05B 37/0272* (2013.01)

(58) Field of Classification Search
CPC ............... H05B 37/0227; H05B 37/0272
USPC .................................. 315/148–159
See application file for complete search history.

(56) References Cited

U.S. PATENT DOCUMENTS

2009/0243517 A1 10/2009 Verfuerth et al.
2011/0031897 A1* 2/2011 Henig ............. H05B 37/0254
315/297

(Continued)

FOREIGN PATENT DOCUMENTS

EP 2362714 A1 8/2011
WO 2007132382 A2 11/2007

(Continued)

*Primary Examiner* — Douglas W Owens
*Assistant Examiner* — Jonathan Cooper
(74) *Attorney, Agent, or Firm* — Meenakshy Chakravorty (57) ABSTRACT

The present invention relates to a method (200), and a corresponding control unit (160), for grouping lighting devices in a system (100) including a plurality of lighting devices (120a-c) and a plurality of presence sensors (130a-c), at least one of the presence sensors being associated with at least one of the lighting devices. The method comprises: receiving (230) input indicating a user interaction element (170a); receiving (240) information from at least one presence sensor, the information indicating whether at least one lighting device associated with the at least one presence sensor is to be part of a group of lighting devices; and associating (280) the group of lighting devices with the indicated user interaction element, which is thereby configured to control the group of lighting devices.

14 Claims, 3 Drawing Sheets

(56) References Cited

U.S. PATENT DOCUMENTS

| | | |
|---|---|---|
| 2011/0172844 A1 | 7/2011 | Choong et al. |
| 2011/0199004 A1* | 8/2011 | Henig ................ H05B 37/0218 315/152 |
| 2011/0199020 A1 | 8/2011 | Henig et al. |
| 2011/0236034 A1* | 9/2011 | Schenk .............. H05B 33/0809 398/201 |
| 2012/0130544 A1 | 5/2012 | Mohan et al. |
| 2012/0280625 A1 | 11/2012 | Zampini, II et al. |
| 2014/0265879 A1* | 9/2014 | Dillen ................ H05B 37/0227 315/153 |

FOREIGN PATENT DOCUMENTS

| | | |
|---|---|---|
| WO | 2010097737 A1 | 9/2010 |
| WO | 2011039688 A1 | 4/2011 |

* cited by examiner

METHOD OF ASSIGNING LIGHTING DEVICES TO A GROUP

CROSS-REFERENCE TO PRIOR APPLICATIONS

This application is the U.S. National Phase application under 35 U.S.C. §371 of International Application No. PCT/IB2014/058035, filed on Jan. 3, 2014, which claims the benefit of U.S. Provisional Patent Application No. 61/749,966, filed on Jan. 8, 2013. These applications are hereby incorporated by reference herein.

FIELD OF THE INVENTION

The present invention relates to lighting systems and control of lighting in lighting systems. In particular, the invention relates to methods and devices for assigning groups of lighting devices in a lighting system.

BACKGROUND OF THE INVENTION

Lighting systems often comprise a plurality of lighting devices adapted to illuminate an area, and light switches or other control devices for controlling the illumination provided by the lighting devices. In such lighting systems, the lighting devices may be arranged in groups, e.g., associated with different rooms, each group being controllable by light switches in the corresponding room. The grouping of the lighting devices may be performed by connecting the appropriate lighting devices to the corresponding light switch, e.g., by wires or by using wireless communication. Forming such connections may be cumbersome and/or time consuming, especially if the number of lighting devices is large. Moreover, if lighting devices or light switches are moved or replaced later on, new groups may have to be formed by making new connections. Hence, it would be desirable to provide easier, more flexible, and/or less time consuming ways of grouping lighting devices in a lighting system.

SUMMARY OF THE INVENTION

An object of at least some of the embodiments of the present invention is to provide a method and a corresponding control unit facilitating and/or improving lighting control reliability and, in particular, the reliability of grouping lighting devices. This and further objects may for example be achieved by means of a method and a control unit having the features defined in the independent claims. Preferred embodiments of the invention are characterized by the dependent claims.

According to a first aspect of the present invention, there is provided a method of grouping lighting devices in a system including a plurality of lighting devices and a plurality of presence sensors, wherein at least one of the presence sensors is associated with at least one of the lighting devices. The method comprises receiving input indicating a user interaction element and receiving information from at least one presence sensor, the information indicating whether at least one lighting device associated with the at least one presence sensor is to be part of a group of lighting devices. The method further comprises associating the group of lighting devices with the indicated user interaction element, which is thereby configured to control the group of lighting devices.

According to a second aspect of the present invention, there is provided a control unit for grouping lighting devices in a system including a plurality of lighting devices and a plurality of presence sensors, wherein at least one of the presence sensors is associated with at least one of the lighting devices. The control unit is configured to receive input indicating a user interaction element and to receive information from at least one presence sensor, the information indicating whether at least one lighting device associated with the at least one presence sensor is to be part of a group of lighting devices. The control unit is further adapted to associate the group of lighting devices with the indicated user interaction element, which is thereby configured to control the group of lighting devices.

A group of lighting devices may be associated with a user interaction element, based on information from at least one presence sensor since such information may indicate whether at least one lighting device associated with the at least one presence sensor is to be part of the group of lighting devices.

The at least one presence sensor may include presence sensors of a single type, or of different types. Presence sensors may be, e.g., motion detectors, heat/infrared detectors or image-capturing devices capable of detecting the presence of persons (or faces of certain persons) in an image or video sequence. A presence sensor associated with a lighting device may optionally be integrated into the lighting device, i.e. the presence sensor and the lighting device may be parts of the same device. For example, the at least one presence sensor from which information is received, may be integrated into a lighting device with which it is associated.

The use of information from at least one presence sensor is advantageous in that the grouping of lighting devices may be based on the presence of a person in a location monitored by the at least one presence sensor. As a presence sensor monitors a location from a distance, there may be no need for a person to touch the sensor itself, or for any other advanced interaction with the sensor, in order to trigger it. Indeed, the person may trigger the presence sensor by (simply) entering a location monitored by the presence sensor. This may enable the grouping of lighting devices to be faster, easier, and or more convenient for the user. For example, a service technician installing/configuring a lighting system, or a user of the lighting system who wants to adjust the grouping of the lighting devices at a later stage, may move below a lighting device in order to trigger a presence sensor associated with the lighting device, thereby indicating that the lighting device is to be part of a group of lighting devices. The use of information from at least one presence sensor makes the grouping procedure easier and/or more intuitive. Further, the grouping procedure is more reliable in that users are less likely to make mistakes in establishing a desired grouping of lighting devices.

The use of information from at least one presence sensor is advantageous as compared to automatic grouping of lighting devices using, e.g., optical transceivers associated with the lighting devices and light switches, in that the risk of associating a lighting device with the wrong user interaction element is reduced. For example, it may be desirable to associate only lighting devices in a room with the user interaction elements in that room. Automatic grouping may not take into account glass walls or open doors, causing lighting devices located outside a room to be unintentionally associated with user interaction elements in that room.

The plurality of lighting devices may comprise lighting devices of a single type or of different types. The lighting devices may be, e.g., light emitting diodes, light bulbs, fluorescent strip lights, etc. The lighting devices may, e.g., be adapted to illuminate a room or the rooms of a floor in a building. The lighting devices may be arranged at, e.g., the ceiling, the walls or the floor of a room.

A presence detector may for example be associated with a lighting device such that the presence sensor is configured to monitor the presence of persons in an area adapted to be illuminated by the lighting device. Optionally, each of the lighting devices in a lighting system may be associated with a corresponding presence sensor in this way. However, it may be envisaged that a lighting device is associated with two or more presence sensors or that a presence sensor is associated with two or more lighting devices.

Input indicating a user interaction element may be received from the user interaction element itself, i.e. a human user may operate the user interaction element, or the input may be received from a separate unit, such as a remote control unit. Alternatively, the user interaction element may be comprised in a remote control unit. There may be a plurality of user interaction elements in the system, and input indicating a user interaction element may indicate a selection of a user interaction element from this plurality. Alternatively, input indicating a user interaction element may indicate presence of a user interaction element in the system, and may indicate that a group of lighting devices is to be associated with this user interaction element.

It is to be noted that groups of lighting devices obtained as described above, and associated with different user interaction elements, need not be disjoint. For example, some lighting devices may be part of several groups and may therefore be associated with several user interaction elements. In other words, a lighting device may be part of two or more different groups. Further, two or more user interaction elements may be associated with the same group of lighting devices.

According to an embodiment, the information (received from the at least one presence sensor) may comprise presence information about the presence of at least one person in at least one location adapted to be illuminated by the at least one lighting device. The at least one lighting device may be adapted to illuminate an area (including the at least one location), and the at least one presence sensor may be adapted to monitor the presence of a person in the at least one location of the area.

According to an embodiment, the presence information may indicate whether the indicated user interaction element is to be configured to control illumination of the at least one location. Presence sensors associated with a lighting device may for example monitor an area corresponding (at least roughly) to the area (or a subset of an area) adapted to be illuminated by that lighting device. A person may therefore define a group of lighting devices to be associated with a user interaction element by moving to locations for which the illumination is to be controlled by the user interaction element. The person does not need to explicitly indicate which lighting devices are to be included, thereby facilitating the grouping procedure and/or rendering it more intuitive.

According to an embodiment, the information (received from the at least one presence sensor) may indicate that the at least one presence sensor has been triggered for a period of time exceeding a threshold. In case there is a plurality of presence sensors associated with the at least one lighting device, the information may alternatively indicate that at least one of these presence sensors has been triggered for a period of time exceeding a threshold.

The time period may preferably be a continuous time period (i.e. without any gaps) during which the at least one presence sensor has been triggered (i.e. without interruption). The use of a threshold may ensure that a short accidental/unintentional triggering of a presence sensor does not affect the grouping of lighting devices. In particular, the threshold may be set at a sufficiently high level (e.g. at one, two, or a few seconds) such that a user may move past a presence sensor without this affecting the grouping. This allows for a more flexible definition of groups, in which a person may walk up to the lighting device that he wishes to include in a group, and walk past lighting devices that are not to be part of the group without (unintentionally) adding the latter lighting devices to the group. For example, lighting devices in a corridor between two rooms may be excluded from a group comprising lighting devices in both rooms.

The threshold may be set at a high level to reduce sensitivity to accidental/unintentional triggering, or may be set at a low level in order to ensure a practical speed for selecting lighting devices of a group. The threshold may be predetermined, i.e. determined during manufacture or installation of the lighting system, or it may be adaptable (manually and/or automatically) during use of the lighting system.

According to an embodiment, the information (received from the at least one presence sensor) may indicate, for at least one lighting device associated with the at least one presence sensor, addition to or removal from the group of lighting devices associated with the indicated user interaction element. For example, a person may be present for a sufficiently long period of time (exceeding a threshold) in an area to be illuminated by a lighting device, and this may be detected by a presence sensor associated with the lighting device. If the at least one lighting device is not already part of the group of lighting devices, the information received from the presence sensor may indicate that the lighting device is to be added to this group. If, however, the at least one lighting device is already part of the group of lighting devices, the received information may indicate that the at least one lighting device is to be removed from this group.

Optionally, settings, e.g., controlled by a user of the lighting system, may determine whether the received information may indicate addition of lighting devices to or removal of lighting devices from the group. For example, a user may indicate via a setting (e.g. by pressing a certain button or flipping a certain switch) that he intends to indicate which lighting devices are to be added to a group. For such a setting, presence detected by presence sensors may indicate addition of lighting devices which do not already belong to a group, but may not indicate removal of lighting devices which already belong to the group. Similarly, a user may indicate via a setting (e.g. by pressing a certain button or flipping a certain switch) that he intends to indicate which lighting devices are to be removed from a group. For such a setting, presence detected by presence sensors may indicate removal of lighting devices which already belong to a group, but may not indicate addition of lighting devices which do not already belong to the group.

According to an embodiment, a group identifier may be transmitted to the group of lighting devices associated with the indicated user interaction element as a confirmation of the termination of the grouping procedure.

The group identifier may advantageously be used at a later point in time by the user interaction element to control the group of lighting devices. For example, an action by the user at the user interaction element (such as flipping a light switch) may be transmitted by the user interaction element in a control command comprising the identifier, in order for the lighting devices assigned to the identifier (i.e. the lighting devices in the associated group) to recognize the transmission as originating from a user interaction element controlling them.

According to an embodiment, input indicating a group definition mode (or a group correction mode) may be received prior to receiving input indicating a user interaction element, thereby initiating definition of the group of lighting devices. The input indicating a group definition (or correction) mode may be received from, e.g., one of the user interaction elements, or from another unit. The use of a group definition (or correction) mode for initiating definition of a group reduces the risk of unintentionally/accidentally defining (or altering) groups of lighting devices. For example, it enables redefinition of groups at time points different from the initial configuration of the lighting system.

Additionally, or alternatively, input indicating a terminated group definition mode may be received, thereby saving a defined group. For example, a group of lighting devices to be associated with a presence sensor may be saved by saving a list of the lighting devices of the group at the user interaction element.

The input indicating a terminated group definition mode may be received from one of the user interaction elements, or from another unit. Optionally, several groups may be defined (and associated with their respective user interaction elements) during a single instance of the group definition mode. For example, the method may comprise defining a first group, receiving input indicating switching to a second group, and defining a second group, before receiving input indicating a terminated group definition mode.

According to an embodiment, the receiving of an input indicating a group definition mode may further comprise transmitting instructions to switch off, or reduce light output of, all lighting devices (in an associated area, or from which the groups may be formed) upon reception of the input indicating a group definition mode. This may indicate to a user that a group definition mode has been initiated and that a user interaction element may be indicated/selected, and/or that a group of lighting devices may be defined.

Additionally, or alternatively, the method may comprise removing any group identifier assigned to lighting devices already associated with the indicated (or selected) user interaction element. The group identifier may be removed upon reception of the input indicating a user interaction element. This action may be used to cancel an old group of lighting devices associated with the indicated user interaction element before defining a new group. Alternatively, the group identifiers assigned to lighting devices already associated with any user interaction element may be removed upon reception of the input indicating a group definition mode. This action may be used to cancel all old groups of lighting devices associated with the user interaction elements, before defining new groups.

According to an embodiment, the method may comprise transmitting instructions to switch on, or increase the light output of, any lighting device already associated with the indicated user interaction element (upon reception of input indicating a user interaction element). As lighting devices already associated with the indicated user interaction element are switched on, determining whether (and/or how) to alter the group of lighting devices associated with the user interaction element is facilitated. A visual confirmation or display of which lighting devices are comprised in the group is obtained.

According to an embodiment, instructions to activate a first light setting (e.g. switch on, or increase light output) on any lighting device for which information that it is to be part of the group is received may be transmitted. The present embodiment is advantageous in that an acknowledgement that the respective lighting device has been added to the group is provided, which may be useful for an operator or user defining a new group or altering a previously defined group.

Additionally, or alternatively, the method may comprise transmitting instructions to activate a second light setting (e.g. switch off, or decrease light output) on any lighting device for which information indicating that it is to be removed from the group associated with the indicated user interaction element is received. The present embodiment is advantageous in that an acknowledgement that the respective lighting device has been removed from the group is provided, which may be useful for an operator or user defining a new group or altering a previously defined group.

According to an embodiment, the control unit may be comprised in a user interaction element, i.e. the method according to any of the preceding embodiments may be implemented in a user interaction element. Optionally, this user interaction element may further comprise a coded light receiver. The coded light receiver may be adapted to receive messages embedded in the light emitted by the at least one lighting device. The user interaction element may optionally comprise a wireless transmitter adapted to transmit messages to the lighting devices, using any suitable wireless technology. For example, the wireless transmitter may be adapted to transmit messages, using visible light or infrared light. The user interaction element may be adapted to communicate (i.e. via the coded light receiver and/or wireless transmitter) with coded light transceivers associated with lighting devices, e.g., to perform automatic grouping of these lighting devices. The coded light transceivers may be adapted to transmit and receive messages embedded in visible light, and may additionally be adapted to receive other types of wireless communication from the wireless transmitters, such as communication using infrared light. Groups of lighting devices defined using automatic grouping may be adjusted based on information from at least one presence sensor, as described in relation to any of the preceding embodiments.

It will be appreciated that any of the features in the embodiments described above for a method according to the first aspect of the present invention may be combined with other embodiments of methods according to the first aspect of the present invention, and with embodiments of a control unit according to the second aspect of the present invention. Similarly, it will be appreciated that any of the features in the embodiments described above for a control unit according to the second aspect of the present invention may be combined with other embodiments of control units according to the second aspect of the present invention, and with embodiments of methods according to the first aspect of the present invention.

Further objectives, features and advantages of the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

The above, as well as additional, objects, features and advantages of the present invention will be better understood through the following illustrative and non-limiting detailed description of preferred embodiments of the present invention, with reference to the appended drawings, in which.

All the Figures are schematic, not necessarily to scale, and generally only show parts which are necessary in order to elucidate the invention, wherein other parts may be omitted or merely suggested.

DETAILED DESCRIPTION

A lighting system having a control unit according to an embodiment of the present invention will now be described with reference to FIG. 1.

A lighting system 100 is arranged to illuminate an area or room 110. The lighting system 100 comprises a plurality of lighting devices 120a-c arranged to illuminate the area 110 from above. Each of the lighting devices 120a-c is associated with, and connected to, a corresponding presence sensor 130a-c. Each of the presence sensors 130a-c is adapted to monitor the presence of at least one person 150 in a region 140a-c below its associated lighting device 120a-c, such that the associated lighting device 120a-c is adapted to illuminate a part of the area 110 at least partly overlapping the region 140a-c. For example, the lighting devices 120a-c may be arranged at the ceiling and each of the presence sensors 130a-c may be arranged at the ceiling close to its respective lighting device 120a-c.

The lighting devices 120a-c may be, e.g., light emitting diodes, light bulbs, fluorescent strip lights, etc., or may be lamps comprising such light sources. The presence sensors 130a-c may be, e.g., motion detectors, heat/infrared detectors or image capturing devices capable of detecting the presence of persons (or faces of certain persons) in an image or video sequence. It is to be noted that, in general, the number of lighting devices 120a-c and the number of presence sensors 130a-c need not coincide. In particular, there may be several presence sensors associated with a lighting device, and/or there may be several lighting devices sharing a common presence sensor.

User Interaction (UI) elements 170a-b are arranged along a wall of the area 110, and may be adapted to control at least some of the lighting devices 120a-c. The UI elements 170a-b may, e.g., be light switches/buttons or control units/elements for dimming the lighting devices 120a-c. The lighting system 100 also comprises a control unit 160 adapted to control lighting (i.e. illumination provided by the lighting devices 120a-c, e.g. based on input from the UI elements 170a-b) in the area 110. It is to be noted that the control unit 160 may be a separate unit, as depicted in FIG. 1, but may just as well be part of one of the UI elements 170a-b. The control unit 160 may comprise a processor or any other type of processing means, or may be a functional aspect of another unit associated with the lighting system 100. The control unit 160 may be adapted to perform a method 200 which will now be described with reference to FIG. 2.

Figure 2:
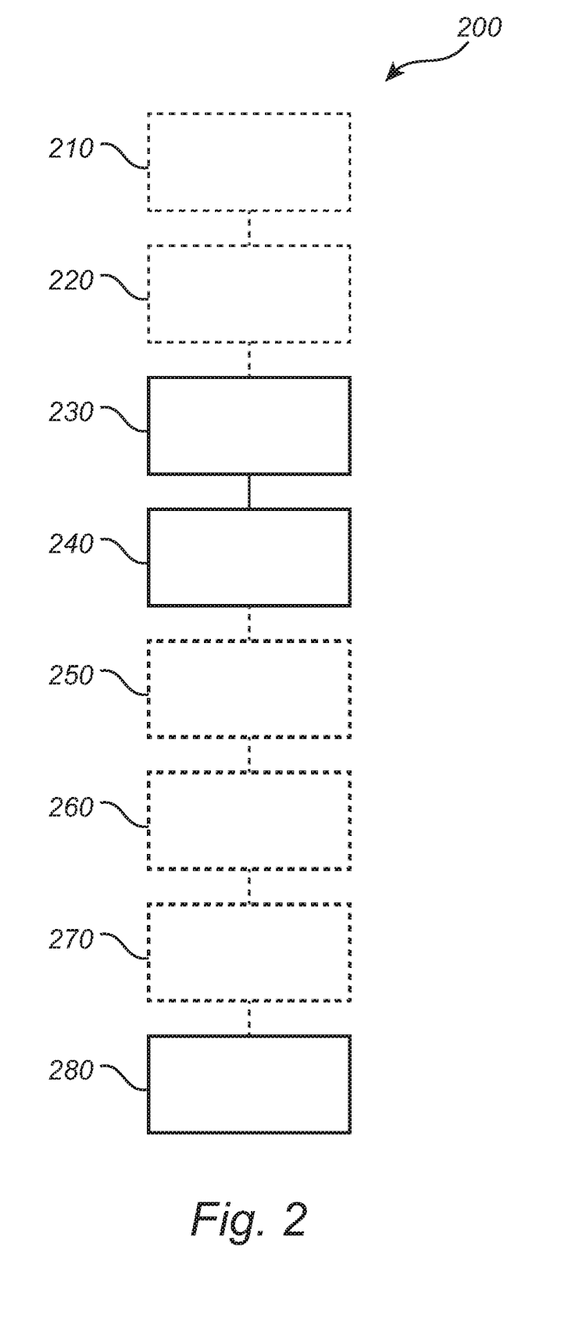
FIG. 2 shows a general outline of a method according to an embodiment of the present invention, which may be performed by the control unit depicted in FIG. 1.

The control unit 160 may receive 230 an input indicating a (selected) UI element 170a-b. For example, a person 150, such as a service technician installing the lighting system 100, or a person 150 using the lighting system 100, may wish to define a group of lighting devices to be controllable by the leftmost UI element 170a. The person 150 may indicate this by activating a switch or button, e.g., located at that UI element 170a. Optionally, the person 150 may indicate 210, prior to selecting the UI element 170a, that the control unit 160 is to switch to a certain group definition mode in which the group of lighting devices may be defined. When entering the group definition mode, the control unit 160 may optionally transmit 220 instructions to the lighting devices 120a-c to be switched off, or dimmed, as an acknowledgement to the person 150 that the group definition mode has been entered and that a UI element 170a-b may be selected.

The person 150 may select which lighting devices 120a-c are to be part of the group by moving around in the area 110 and triggering the different presence sensors 130a-c. For example, the person 150 may move to the leftmost region 140a. Presence of the person 150 may be detected by the leftmost presence sensor 130a, and information about this may be sent to the control unit 160. The control unit 160 may receive 240 this information indicating that the leftmost lighting device 120a, associated with the leftmost presence sensor 130a, is to be part of a group of lighting devices. Optionally, the person 150 may move to a plurality of regions 140a-c in order to indicate that the corresponding lighting devices 120a-c are to be part of the group, thereby causing the control unit 160 to add 250 these lighting devices 120a-c to the group. Optionally, the control unit 160 may transmit 260 instructions to switch on, or increase light output of, any lighting device 120a-c for which information to be part of the group is received (i.e. from the person 150 via the presence sensors 130a-c), thereby acknowledging that the respective lighting device 120a-c has been added to the group, which is advantageous in that it provides a visual confirmation to the person 150.

It is to be noted that switching off all lighting devices 120a-c when entering the group definition mode, and switching on lighting devices 120a-c which are added to the group of lighting devices may be a preferred way of providing acknowledgement to a person 150 as it may be very user-friendly. However, other ways of providing acknowledgement may also be envisaged. For example, all lighting devices 120a-c may be switched on when entering the group definition mode, and lighting devices 120a-c may be switched off when added to the group of lighting devices.

When the person 150 has indicated which lighting devices 120a-c are to be part of the group, the control unit 160 may associate 280 the group of lighting devices with the selected UI element 170a-b, which is thereby configured to control the group of lighting devices. Optionally, the person 150 may indicate that the group definition mode is to be ended or terminated by operating a switch or button, e.g., at the user interaction element 170a-b at which the group definition mode was initiated. The control unit 160 may receive 270 the input indicating a terminated group definition mode and may save the defined group.

Returning to FIG. 1, each of the lighting devices 120a-c may be adapted to transmit and receive messages using coded light, i.e. to transmit and receive messages embedded in visible light in order to participate in automatic grouping/commissioning (see for instance WO 2010/097737 A1 by the present assignee for a detailed example of automatic commissioning using coded light). For example, each of the lighting devices 120a-c may be connected to, or equipped with, a coded light transceiver 180a-c adapted to receive and transmit coded light. Alternatively, the lighting devices 120a-c may be adapted to transmit coded light embedded in the light output they provide to illuminate the area 110, and may have separate light receivers/sensors adapted to receive coded light.

Each of the UI elements 170a-b may also be adapted to transmit and receive messages wirelessly (e.g. using coded light) in order to participate in automatic grouping/commissioning. Each of the UI elements 170a-b may comprise a wireless transceiver 171a-b for transmitting and receiving messages wirelessly. The wireless transceivers may act as coded light transceivers by transmitting and receiving messages using coded light, i.e. to transmit and receive messages embedded in visible light. However, as the UI elements 170a-b may not be adapted to provide visible light in order to illuminate the area 110, the wireless transceivers 171a-b may preferably use wireless technology types other than coded light to transmit messages. For example, the wireless transceivers 171a-b may act as coded light receivers by receiving messages embedded in visible light, but may transmit messages using light invisible to the human eye, such as infrared light. In that case, the coded light transceivers 180a-c connected to the lighting devices 120a-c may preferably be further adapted to receive messages transmitted using the wireless technology applied by the wireless transceivers 171a-b.

Figure 1:
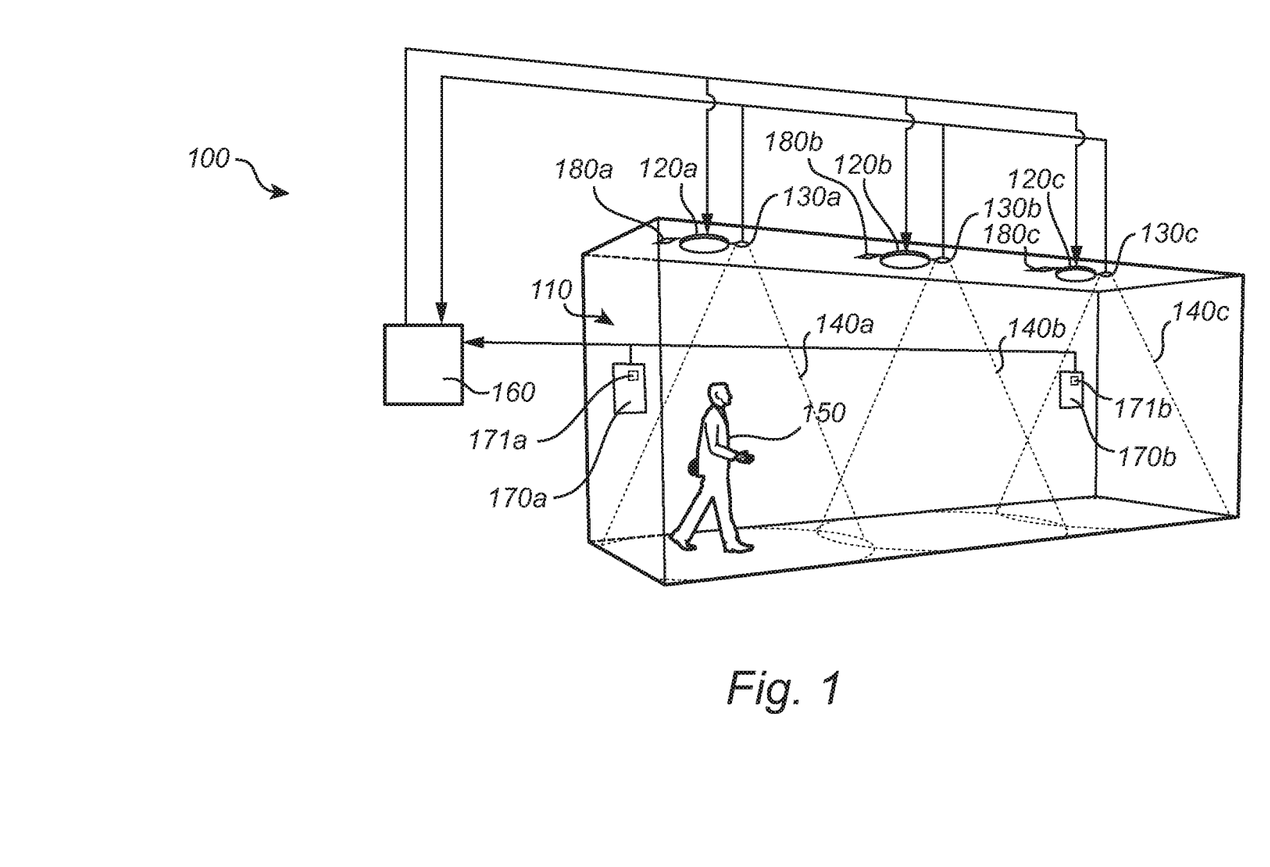
FIG. 1 schematically shows a lighting system with a control unit according to an embodiment of the present invention.

The purpose of the connections depicted in FIG. 1, between the control unit 160 and the lighting devices 120a-c, the presence sensors 130a-c and the UI elements 170a-b, respectively, is to show that information may be sent between these units. The connections may be wireless communication links, e.g. based on coded light or any other suitable wireless technology. Alternatively, at least some of these connections may be electrical connections, e.g. via wires or cables.

Figure 3:
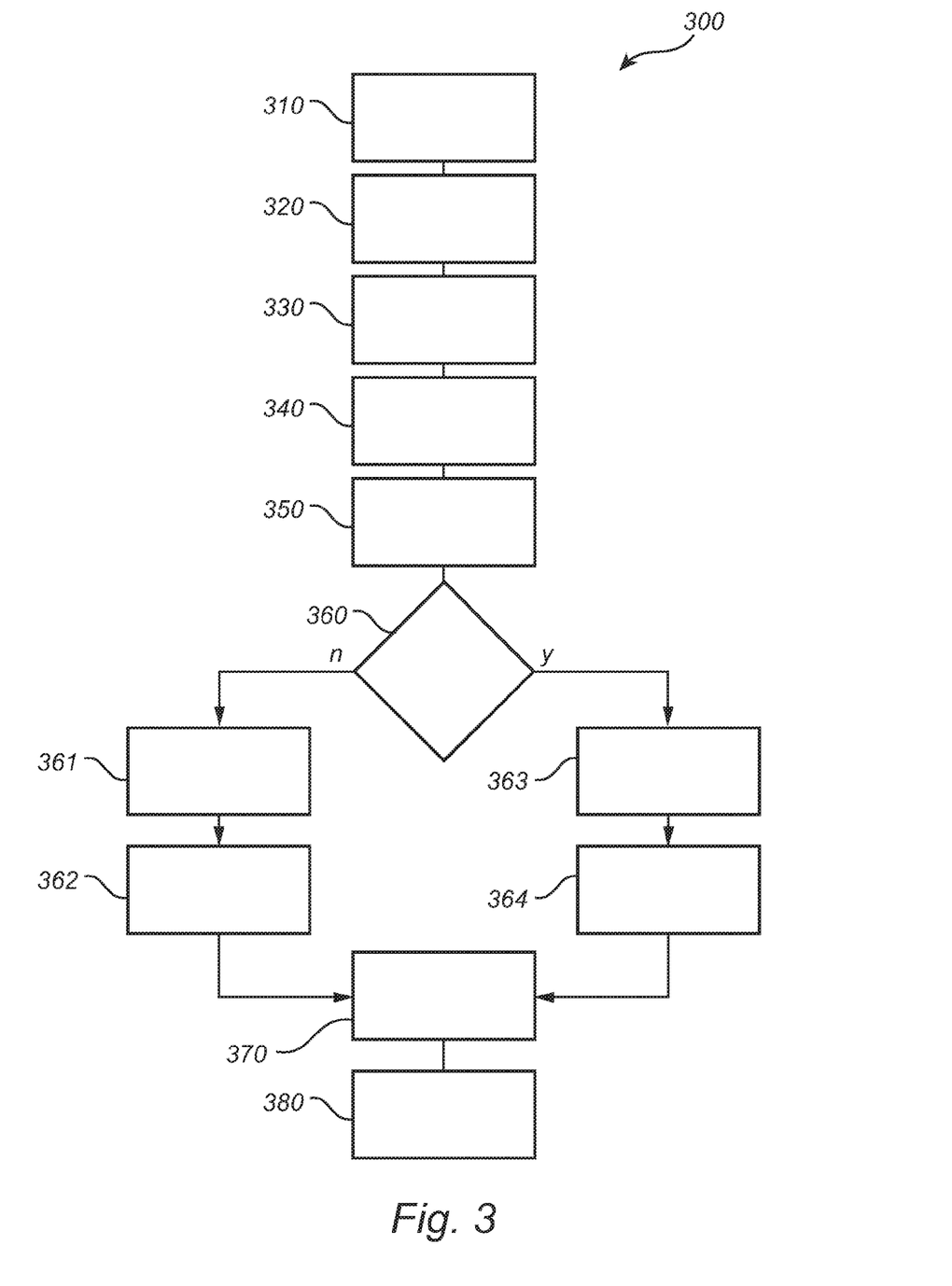
FIG. 3 shows a general outline of a method according to another embodiment of the present invention, parts of which may be performed by the control unit depicted in FIG. 1.

A method 300 of correcting groups of lighting devices, e.g. initially defined by automatic grouping, will now be described with reference to FIG. 3.

The first time the lighting system 100 is switched on, an automatic grouping phase 310 may be initiated in which lighting devices 120a-c are grouped and associated with UI elements 170a-b. During this phase the transceivers 171a-b, 180a-c start emitting messages including identifiers, ID, into their light output, and optionally also including their function in the system (e.g. UI element, lighting device with presence sensor, lighting device without presence sensor, etc.). The IDs may be unique, in the lighting system, for the respective transceiver (or associated lighting device 120a-c or UI element 170a-b), or may for example be worldwide unique IEEE MAC addresses. These messages are received by the other transceivers 171a-b, 180a-c in the lighting system 100. Since the light may be blocked by physical separations like walls, and may be attenuated over distance, transceivers 171a-b, 180a-c receiving the ID of a common transceiver 171a-b, 180a-c may be considered to be logically part of the same group, i.e. may be controlled in the same way. For example, (the transceivers 180a-b of) the two leftmost lighting devices 120a and 120b may receive the ID sent by (the transceiver 171a of) the leftmost UI element 170a, while the rightmost lighting device 120c may be too far away to receive that ID. Hence, the two leftmost lighting devices 120a-b may form a group of lighting devices controllable by the leftmost UI element 170a.

The actual pairing may then be done in different ways:
a) Passive: every lighting device 120a-c saves/stores the IDs of UI elements 170a-b that it has received, and when receiving a control message during normal operation of the lighting system 100, with the same ID, it will react to it. In the above example, the two leftmost lighting devices 120a-b save/store the ID of the leftmost UI element 170a.

b) Passive-proactive sending: every UI element 170a-b keeps a list of all the lighting devices 120a-c from which it received a signal during the configuration phase. During normal operation of the lighting system 100, it will include this whole list of IDs in the control messages it sends via its transceiver 171a-b in order to indicate that the lighting devices 120a-c with these IDs need to react based on this message. In the above described example, the leftmost UI element 170a may have received IDs only from the two leftmost lighting devices 120a-b (and not the rightmost lighting device 120c) and may therefore include these two IDs in the control messages it sends.

c) Proactive: the transceivers 171a-b of the UI elements 170a-b send, after collecting the list of IDs of lighting devices 120a-c, a group ID to all the lighting devices 120a-c from which they have received an ID. In the normal operation mode, all these lighting devices 120a-c react to instructions associated with this newly assigned group ID. In the above described example, the leftmost UI element 170a has received the IDs of the two leftmost lighting devices 120a-b and therefore sends a group ID to these two lighting devices 120a-b.

After a fixed period of time, the lighting system 100 may be automatically switched to a normal operation mode, so that a person 150 can test 320 the behavior of the lighting system 100. In this normal operation mode, the UI elements 170a-b may transmit control messages to their respective group of lighting devices, using their wireless transceivers 171a-b. Alternatively, other communication means, such as electrical connections, may be used during the normal operation phase. However, the IDs of the pairings obtained in the automatic grouping step are still used to identify the different groups in the normal operation phase.

In the normal operation phase, a person/user 150 may indicate 330 that the control unit 160 is to switch to a group correction mode. The person 150 may have realized that the automatic grouping/configuration step has not achieved a desirable result, and may wish to correct at least one of the automatically configured groups. The person 150 may initiate the group correction mode by operating a UI element 170a-b, e.g. by toggling a switch of the UI element 170a-b a predefined number of times. This may also indicate selection 340 of that particular UI element 170a-b, which requires an associated group of lighting devices to be corrected. The UI element 170a-b may then transmit a message to the lighting devices 120a-c and the other UI elements 170a-b in the lighting system 100 to notify them that the group correction mode is initiated. As a visual feedback, the lighting devices 120a-c may change their light output to a certain predefined setting, e.g. all off. Additionally, or alternatively, the selected UI element 170a-b may transmit 350 instructions to switch on, or set to a certain level, the lighting devices 120a-c in the group previously associated with the selected UI element 170a-b. For example, the person 150 may have noticed that only the two leftmost lighting devices 120a-b are associated with the leftmost UI element 170a, and may wish to associate also the rightmost lighting device 120c with the leftmost UI element 170a. In the present example, when the person 150 activates the group correction mode, all lighting devices 120a-c are switched off, and when the person selects the leftmost UI element 170a, the associated two leftmost lighting devices 120a-b only are switched on.

The person 150 may select which lighting devices 120a-c are to be added or removed from a group by moving around in the area 110 and triggering the different presence sensors 130a-c associated with the lighting devices 120a-c. For example, the person 150 in the above described example may wish to add the rightmost lighting device 120c to the group associated with the leftmost UI element 170a. The person 150 may then move to the rightmost region 140c and stay there for, e.g., three seconds. The presence of the person 150 may be detected by the rightmost presence sensor 130c and information about this presence may be received 360 by the control unit 160. Provided that the person 150 has been present in the rightmost region 140c for a time period exceeding a threshold, e.g. a threshold of two seconds, the control unit 160 may react to this presence. The control unit may check whether the rightmost lighting device 120c is already associated with the leftmost UI element 170a. If this lighting device 120c is not already part of the group (this is indicated by n in FIG. 3) the received information indicates that it is to be added 361 to the group. The addition of the rightmost lighting device 120c may be acknowledged to the person 150 by transmitting instructions to the rightmost lighting device 120c to be switched on 362. Similarly, if the rightmost lighting device 120c was already associated with the leftmost UI element 170a, the received information would indicate that it is to be removed 363 from the group, and optionally, the removal of the rightmost lighting device 120c would have been acknowledged to the person 150 by transmittal of instructions to the rightmost lighting device to be switched off 362.

By adding and/or removing lighting devices 120a-c as described above, the grouping is changed. For the a) type pairing described above, the lighting devices 120a-c remove/add the UI element address from/to the list of IDs it responds to. For b) type pairing, the lighting devices 120a-c confirm to the selected UI element 170a-b that they will, or will not, be part of its associated group. In the case of c) type pairing, either a lighting device 120a-c updates its list of group IDs that it reacts to directly after the presence sensor associated with the lighting device 120a-c has been triggered, or reports to the selected UI element 170a-b that its state has changed, by sending a message containing the identifier of the lighting device 120a-c.

When the person 150 has indicated which lighting devices 120a-c are to be added to/removed from a group, he may indicate that the group definition mode is to be ended or terminated by operating a switch or button, e.g., at a user interaction element 170a-b. The control unit 160 may receive 370 the input indicating a terminated group. Depending on the pairing type used, see paring types a), b) and c) above, the corrected group of lighting devices may have already been associated 380 with the selected UI element 170a-b. In the case c) type pairing defined above, the corrected group may be stored 380 (and associated with the selected UI element 170a-b) by the UI element 170a-b transmitting to the members of the group, the group ID, which will subsequently be used in the operational phase to send control messages.

It is to be noted that in some cases, two or more UI elements 170a-b may be associated with the same group of lighting devices. In such cases, these UI elements 170a-b may use the same group ID to send control messages.

While embodiments of the invention have been illustrated and described in detail in the drawings and foregoing description, such illustration and description are to be considered illustrative or exemplary and not restrictive; the invention is not limited to the disclosed embodiments. For example, it is possible to operate the invention in an embodiment in which one or more groups of lighting devices have been defined in ways other than automatic grouping/commissioning using coded light, e.g. manually or using other automatic methods. Indeed, such previously defined groups may be redefined or corrected by means of methods according to at least some embodiments of the present invention. Moreover, the number of lighting devices in the above examples has been three, but the embodiments of the invention described above are applicable for lighting systems having a larger number of lighting devices.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method of grouping lighting devices in a system including a plurality of lighting devices and a plurality of presence sensors, at least one of the presence sensors being associated with at least one of the lighting devices, said method comprising the steps of:
   receiving input indicating selection or activation of a user interaction element by a person;
   receiving information from at least one presence sensor indicative of a presence at the sensor and using said information when in a group definition mode to indicate that said at least one lighting device associated with said at least one presence sensor is to be part of a group of lighting devices, wherein said information indicates that said at least one presence sensor has been triggered for a period of time exceeding a threshold; and
   associating said group of lighting devices with the indicated user interaction element, which is thereby configured to control said group of lighting devices.

2. The method of claim 1, wherein said information comprises presence information about the presence of at least one person in at least one location adapted to be illuminated by said at least one lighting device.

3. A method of grouping lighting devices in a system including a plurality of lighting devices and a plurality of presence sensors, at least one of the presence sensors being associated with at least one of the lighting devices, said method comprising the steps of:
   receiving input indicating selection or activation of a user interaction element by a person;
   receiving information from at least one presence sensor indicative of a presence at the sensor and using said information when in a group definition mode to indicate that said at least one lighting device associated with said at least one presence sensor is to be part of a group of lighting devices; and
   associating said group of lighting devices with the indicated user interaction element, which is thereby configured to control said group of lighting devices;
   wherein, when in group definition mode, said information indicates, for at least one lighting device associated with said at least one presence sensor, when not part of the group, the addition to or, when part of the group, the removal from the group of lighting devices associated with the indicated user interaction element.

4. The method of claim 1, further comprising transmitting an identifier to the group of lighting devices associated with the indicated user interaction element as a confirmation of a termination of the associating step.

5. The method of claim 1, further comprising receiving, prior to receiving input indicating selection or activation of a user interaction element, input indicating a start of the group definition mode, thereby initiating definition of said group of lighting devices.

6. The method of claim 5, further comprising receiving input indicating a terminated group definition mode, thereby saving a defined group of lighting devices.

7. The method of claim 5, further comprising transmitting instructions to switch off or to dim the plurality of lighting devices upon reception of the input indicating the initiation of the group definition mode.

8. A method of grouping lighting devices in a system including a plurality of lighting devices and a plurality of presence sensors, at least one of the presence sensors being associated with at least one of the lighting devices, said method comprising the steps of:
receiving input indicating selection or activation of a user interaction element by a person;
receiving information from at least one presence sensor indicative of a presence at the sensor and using said information when in a group definition mode to indicate that said at least one lighting device associated with said at least one presence sensor is to be part of a group of lighting devices;
removing any grouping of lighting devices already previously associated with the indicated user interaction element; and
associating said group of lighting devices with the indicated user interaction element, which is thereby configured to control said group of lighting devices.

9. A method of grouping lighting devices in a system including a plurality of lighting devices and a plurality of presence sensors, at least one of the presence sensors being associated with at least one of the lighting devices, said method comprising the steps of:
upon receiving input indicating selection or activation of a user interaction element, transmitting instructions to switch on any lighting device already previously associated with the indicated user interaction element;
receiving information from at least one presence sensor indicative of a presence at the sensor and using said information when in a group definition mode to indicate that said at least one lighting device associated with said at least one presence sensor is to be part of a group of lighting devices; and
associating said group of lighting devices with the indicated user interaction element, which is thereby configured to control said group of lighting devices.

10. The method of claim 1, further comprising one step selected from the group comprising:
transmitting instructions to activate a first light setting on a lighting device for which information that it is to be added to said group of lighting devices is received; and
transmitting instructions to activate a second light setting on a lighting device for which information indicating that it is to be removed from said group of lighting devices is received.

11. A control unit for grouping lighting devices in a system including a plurality of lighting devices and a plurality of presence sensors, at least one of the presence sensors being associated with at least one of the lighting devices, said control unit being configured to:
receive input indicating selection or activation of a user interaction element by a person;
receive information from at least one presence sensor indicative of a presence at the sensor and use said information when in a group definition mode to indicate that said at least one lighting device associated with said at least one presence sensor is to be part of a group of lighting devices, wherein said information indicates that said at least one presence sensor has been triggered for a period of time exceeding a threshold; and
associate said group of lighting devices with the indicated user interaction element, which is thereby configured to control said group of lighting devices.

12. The control unit of claim 11, being further configured to perform the method of claim 1.

13. A user interaction element comprising a control unit as defined in claim 11.

14. The user interaction element of claim 13, further comprising a coded light receiver.

* * * * *